(12) United States Patent
Grace et al.

(10) Patent No.: US 9,390,446 B2
(45) Date of Patent: Jul. 12, 2016

(54) CONSUMER CENTRIC ONLINE PRODUCT RESEARCH

(71) Applicant: INTERNATIONAL BUSINESS MACHINES CORPORATION, Armonk, NY (US)

(72) Inventors: Julia Grace, San Jose, CA (US); Eser Kandogan, Mountain View, CA (US); Michael I. Merchant, South Barrington, IL (US); Joe Redmon, Unalaska, AK (US); Richard Steigerwald, San Luis Obispo, CA (US); Kiran J. Thomas, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 638 days.

(21) Appl. No.: 13/685,828

(22) Filed: Nov. 27, 2012

(65) Prior Publication Data

US 2014/0149259 A1    May 29, 2014

(51) Int. Cl.
*G06Q 30/00* (2012.01)
*G06Q 30/06* (2012.01)
(52) U.S. Cl.
CPC ........ *G06Q 30/0629* (2013.01); *G06Q 30/0601* (2013.01); *G06Q 30/0623* (2013.01)
(58) Field of Classification Search
CPC ............. G06Q 30/0601–30/0645; G06Q 30/08
USPC .............................................. 705/26.1–27.2
See application file for complete search history.

(56) References Cited

U.S. PATENT DOCUMENTS

| | | | |
|---|---|---|---|
| 6,751,600 B1 * | 6/2004 | Wolin | G06F 17/30707 706/12 |
| 7,630,968 B2 | 12/2009 | McCammon et al. | |
| 7,636,677 B1 * | 12/2009 | McGonigal | G06F 17/30867 705/26.7 |
| 8,001,010 B2 | 8/2011 | Ho et al. | |
| 8,401,924 B1 * | 3/2013 | Rajyaguru | G06Q 30/0629 705/26.1 |
| 2006/0161480 A1 * | 7/2006 | Christensen | G06Q 10/02 705/14.1 |
| 2009/0307100 A1 | 12/2009 | Nguyen et al. | |
| 2009/0319357 A1 * | 12/2009 | Flake | G06Q 30/02 705/14.25 |

\* cited by examiner

*Primary Examiner* — Jason Dunham
*Assistant Examiner* — Katherine O'Sullivan
(74) *Attorney, Agent, or Firm* — Cantor Colburn LLP

(57) ABSTRACT

Embodiments of the invention relate to providing online product research. Data related to an activity performed by a consumer at a first electronic commerce website is collected. The collected data includes information about a first product, and the information about the first product is stored as product research data. The product research data is associated with the consumer. It is detected that the consumer is accessing a location in a second electronic commerce website that includes information about a second product. The product research data is searched for data related to the information about the second product. The information about the first product is located in response to searching the product research data for data related to the information about the second product, and the consumer is presented with the information about the first product along with the information about the second product.

18 Claims, 5 Drawing Sheets

202 — PRODUCT CATEGORY - MICROWAVE OVEN
204 {
- NOTE 1 - USER NOTES (TEXT)
- NOTE 2 - BUYING GUIDE (IMAGE & TEXT & URL)
- NOTE 3 - EXPERT SUGGESTIONS (IMAGE & URL)
- NOTE 4 - CONSUMER GUIDE (URL)

206 — PRODUCT A - BRAND Y MODEL K
208 {
- NOTE 1 - CAPACITY (IMAGE & URL)
- NOTE 2 - COLOR (IMAGE & TEXT & URL)
- NOTE 3 - SUGGESTED RETAIL PRICE (IMAGE & URL)
- NOTE 4 - COOKING POWER (TEXT & URL)
- NOTE 5 - CONTROLS (IMAGE & URL)
- NOTE 6 - USER NOTES (TEXT)

210 — PRODUCT B - BRAND Y MODEL W
212 {
- NOTE 1 - USER NOTES (TEXT)
- NOTE 2 - CONTROLS (IMAGE & URL)
- NOTE 3 - CAPACITY (TEXT & URL)
- NOTE 4 - COOKING POWER (IMAGE & URL)
- NOTE 5 - SELLER (TEXT & URL)
- NOTE 6 - PICTURE (IMAGE & URL)

⋮

214 — PRODUCT X

CONSUMER CENTRIC ONLINE PRODUCT RESEARCH

BACKGROUND

The present invention relates generally to online shopping, and more specifically, to consumer centric online product research.

Many consumers use online information resources to conduct product research. A typical consumer may visit several electronic commerce websites as well as consult user reviews, forums, blogs (e.g., video blogs), and expert reviews (e.g. how to buy sites, product reviews). In addition, a consumer may also ask their friends and colleagues on their social network for opinions and information. Web search engines help consumers significantly in that they can be used to easily find information about products. However, it is often up to the consumers to bring all the information collected from several resources together and make sense from it. The amount of information available online about different products is plentiful and can sometimes be overwhelming for consumers.

Providers of electronic commerce websites are interested in identifying potential purchasers of their products and in directing these potential purchasers to their websites. Web search engines have served this implicit function by channeling keywords that online users searched to advertisement networks, where manufacturers and retailers bid on specific keywords in order to get the online users directed to their websites. This method does not necessarily have a high probability of resulting in purchases since people use web search engines for a variety of reasons and it is never certain that a user who is typing in a specific keyword is a likely buyer. Furthermore, web search engines do not provide much information about a user. A typical web search engine provides a location of the user based on an Internet protocol address, as well as websites previously visited by the user based on cookies. Thus, profiles of users as determined by web search engines are often shallow and do not contain enough information for segmenting potential purchasers.

BRIEF SUMMARY

An embodiment is a method of providing online product research. The method includes collecting data related to activity performed by a consumer at a first electronic commerce website. The collected data includes information about a first product, and the information about the first product is stored as product research data. The product research data is associated with the consumer. It is detected that the consumer is accessing a location in a second electronic commerce website that includes information about a second product. The product research data is searched for data related to the information about the second product. The information about the first product is located in response to searching for data related to the information about the second product. The consumer is presented with the information about the first product along with the information about the second product.

Another embodiment is a computer program product for providing online product research. The computer program product includes a computer readable storage medium having computer readable program code embodied therewith. The program code is executable by a processor to collect data related to activity performed by a consumer at a first electronic commerce website. The collected data includes information about a first product, and the information about the first product is stored as product research data. The product research data is associated with the consumer. It is detected that the consumer is accessing a location in a second electronic commerce website that includes information about a second product. The product research data is searched for data related to the information about the second product. The information about the first product is located in response to the searching for data related to the information about the second product. The consumer is presented with the information about the first product along with the information about the second product.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2 depicts contents of a product research database in accordance with an embodiment;

DETAILED DESCRIPTION

Figure 1:
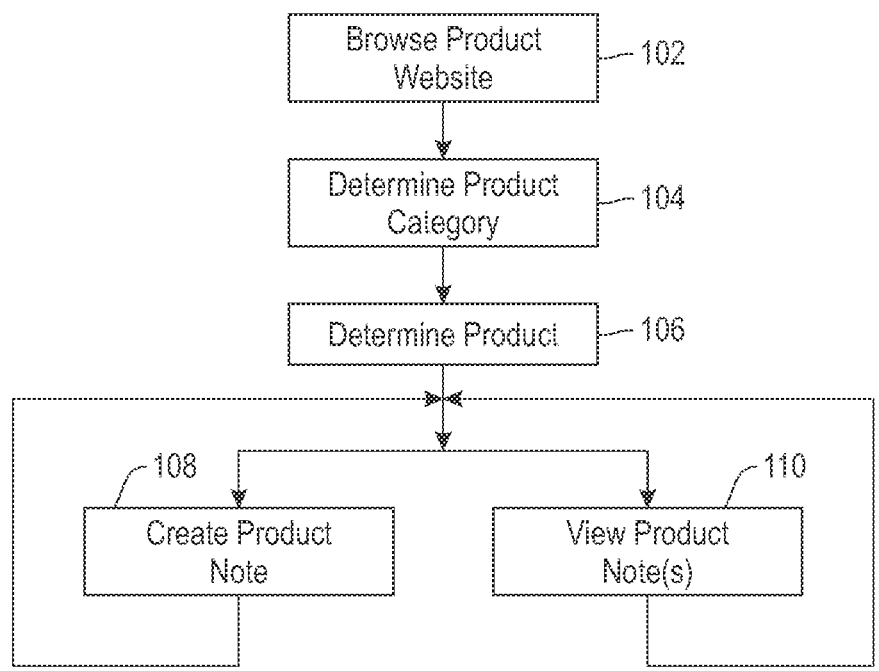
FIG. 1 depicts a process flow for providing online product research in accordance with an embodiment.

Embodiments described herein include a product research tool for consumers. The product research tool aids a consumer in gathering and organizing information from several electronic commerce websites by extracting data about attributes (also referred to herein as "features") of products and associating them with notes. In addition, the product research tool supports purchasing decisions by identifying attributes of a product that are important to the consumer and organizing information gathered accordingly. In additional embodiments, a consumer's social network is leveraged to consult and gather feedback on the product and its attributes. An embodiment of the product research tool allows consumers to perform an expedited online comparison of attributes of multiple products through the automation of data collection and organization as described herein.

An embodiment provides a product research tool that allows a user to browse web pages as they normally would while taking notes about products described in the web pages. For notes having content that is copied from a web page, a link to the original source is stored (e.g., as an uniform resource locator or "URL"). If the original source is revisited, a web browser pulls the note and displays the note. When a user browses similar products in the same product category, previously recorded attributes are automatically identified in the new product descriptions and organized by appropriate attribute name, thus providing automated identification and recording of product information on the page through text analytics. In addition, the product research tool provides automated categorizing and sorting of highlights, comments, and notes, as well as an integrated display of notes and annotations on a page as viewers browse the page.

Embodiments also allow retailers to leverage information collected by the online product research tool to segment or micro-segment a consumer and offer incentives during the consumer's product research. As used herein, the term "consumer" refers to a potential purchaser of a product, that is, someone who has not purchased the product but who is using the product research tool to research the product. As used herein, the term "buyer" refers to an actual purchaser of the product. As used herein, the term "segment a consumer" refers to classifying consumers into segments that distinguish them by demographics, interests and other information about them. As used herein, the term "micro-segment" is one type of segment that includes product-related characteristics of the consumer, such as, but not limited to, desired attributes of the product, potential uses of the product by the consumer.

An embodiment described herein aids a seller in identifying potential buyers easily, as it leverages information collected by a product research tool that is used by the consumer before a purchase is made. Buyers are profiled based on information collected by the buyers during their research process. In an embodiment, the collected information includes attributes and concerns identified by the buyer as being important. Data mining may be used to analyze buyer profiles to compare profiles of different buyers to create a decision tree with probabilities of potential product purchases, using, for example, the data collected about all users with similar concerns and their eventual purchases. In embodiment, the results of the data mining are used to match profiles of individual consumers with manufacturers and retailers, who may then offer incentives and/or display advertisements to an individual prospective buyer.

From the retailer perspective, having such a product research tool that gathers consumer interests may lead to more product sales. Embodiments described herein aid retailers (or manufacturers or other sellers) in identifying consumers that are likely to make a purchase soon and then convincing the consumers to buy a specific brand or to buy from a specific electronic commerce site. In general, computer users collecting information on products using an embodiment of a product research tool such as that described herein are likely to be potential buyers and likely to be making a purchase in the near future. Information collected by the users themselves in product research tools is more likely to be indicative of user's specific interests in products. For example, a user researching cameras and collecting information on camera resolutions is likely to be concerned about picture quality.

FIG. 1 depicts a process flow for providing online product research in accordance with an embodiment. In an embodiment, the process flow is implemented by a product research tool (e.g., an application program) executing on a computer and interacting with a consumer via, for example, an input device such a keyboard and/or mouse, and an output device such as a display device. At block 102, a consumer initiates the product research tool and browses a product website (e.g., by entering keywords related to a product of interest and/or by returning to a product website previously visited using the product research tool). As used herein, the terms "product website" and "electronic commerce website" are used interchangeably to refer to websites that contain information about products that may be purchased. In an embodiment, the product research tool detects that the consumer is viewing a first location in the product website based on, for example, a cursor location.

At block 104, the product research tool determines the category of the product currently being viewed by the consumer (also referred to herein as "the user"). The category of the product currently being viewed by the consumer may be determined based on, for example, one or more text strings that are derived based on input from the user specifying a product category, based on one or more search terms used to access the product website, based on text located on a web page currently being viewed, based on hypertext markup language (HTML) tags and/or based on HTML content associated with the web page currently being viewed. In an embodiment, where a product research database (or other location where product research data is stored) associated with the user includes previously saved product category data, the text string(s) is compared to the saved product category data to determine if there is a match. In an embodiment, when a match is located in the saved product category data in the product research database associated with the user, it is presented to the user for verification. In another embodiment, when a match is located, it is assumed to be correct and no user verification is performed. In a further embodiment, user verification is performed based on a confidence level associated with the match (e.g., a high level of confidence would not require verification and a low level of confidence would require verification). In an embodiment, text analytics is used to extract product related feature names, so that product related feature names (e.g., resolution) can be used to identify a product category and particular product.

In an embodiment, the text string(s) is always presented to the user for verification when no match is found between the text string(s) and the saved product category data in the product research database associated with the user, or when there is no saved product category data in the product research database associated with the user. In an embodiment, either of these situations can be expressed as a low level of confidence level associated with the match.

In an embodiment, the comparison of the text string(s) to the saved product category data to determine if there is a match is performed using text analytics such as feature matching. For example, if the user is browsing a product web page which contains product feature names such as resolution, lens type, and memory, matching can be made based on the set of features described on the page. In addition, many product web pages, particularly for big retailers, contain a product tree (e.g., Electronics>Camera & Photo>Digital Cameras→Digital SLR Cameras) that describes where a particular product lies in terms of the category. This can be parsed and the particular product category can be extracted. Another way is to extract identifiers such as, but not limited to, product codes, and model numbers (e.g., OLYMPUS E-P2 12.3, KLV35400, . . . ) and to use them in conjunction with a database of product codes to identify a product category. As can be seen there are several ways of performing text analytics to identify a product category. In an embodiment, two or more of these techniques are used to increase the confidence level. One benefit to the use of text analytics is that it allows users to tag and share product information across different websites that may use different names for products that are in the same product category or that are the same product.

In an embodiment, deriving one or more text strings based on one or more search terms used to access the product website is performed by comparing the text string against a search index which associates a set of keywords with product categories.

In an embodiment, deriving one or more text strings based on text located on a web page currently being viewed is performed by identifying the location of the text selected from the web page and examining the web document structure.

In an embodiment, deriving one or more text strings based on HTML tags associated with a web page current being viewed is performed by examining the tags within which the product feature is mentioned and searching for similar tags in other web pages (e.g., a table of product features).

In an embodiment, deriving one or more text strings based on HTML content associated with a web page currently being viewed is performed by examining both the structure of the web document and content of each node in the web document.

In an embodiment, the comparison of the text string(s) to the saved product category data to determine if there is a match is performed in the background without user interaction by performing text extraction using the identified structure of the web document in subsequent visits. For example, if a product feature is mentioned in the same location of a table in the web document, the location of the table and particular cell in the table can be used to identify product features.

At block 106, the product research tool determines the product currently being viewed by the user. The product currently being viewed by the user (e.g., via a display device) may be determined based on, for example, one or more text strings that are derived based on input from the user specifying a product category, one or more search terms used to access the product website, based on text located on a web page currently being viewed, based on HTML tags and/or based on HTML content associated with the web page currently being viewed. In an embodiment, where the product research database associated with the user includes previously saved product data, the text string(s) is compared to the saved product data to determine if there is a match. In an embodiment, when a match is located in the saved product data in the product research database associated with the user, it is presented to the user for verification. In another embodiment, when a match is located, it is assumed to be correct and no user verification is performed. In a further embodiment, user verification is performed based on a confidence level associated with the match (e.g., a high level of confidence would not require verification and a low level of confidence would require verification).

In an embodiment, the text string(s) is always presented to the user for verification when no match is found between the text string(s) and the saved product data in the product research database associated with the user, or when there is no saved product data in the product research database associated with the user.

In an embodiment, the comparison of the text string(s) to the saved product data to determine if there is a match is performed using text analytics such as those described previously.

In an embodiment, the comparison of the text string(s) to the saved product data to determine if there is a match is performed in the background without user interaction as described previously.

At block 108, the product research tool creates a note about an attribute of the product currently being viewed by the user. In an embodiment, a heading of the created note includes a subject (e.g., an attribute that is described by the note), a timestamp, a current location (e.g., an URL), and/or an author identifier. The author identifier refers to the source of the note, such as, but not limited to what user created the note and/or which site the selected text came from. In addition, the product research tool may keep track of the date all notes were created and/or commented on. This allows the user of the product research tool to easily go the source of the notes from the product entry user interface.

In an embodiment, the subject of the note is determined by the product research tool based on, for example, one or more text strings that are derived based on input from the user specifying a subject, one or more search terms used to access the product website, based on text located on a web page currently being viewed, based on HTML tags and/or based on HTML content associated with the web page currently being viewed. In an embodiment, where the product research database associated with the user includes previously saved note data, the text string(s) is compared to the subjects of the saved note data to determine if there is a match. In an embodiment, when a match is located in the saved note data in the product research database associated with the user, it is presented to the user for verification. In another embodiment, when a match is located, it is assumed to be correct and no user verification is performed. In a further embodiment, user verification is performed based on a confidence level associated with the match (e.g., a high level of confidence would not require verification and a low level of confidence would require verification).

In an embodiment, the text string(s) is always presented to the user for verification when no match is found between the text string(s) and the subject in the saved note data in the product research database associated with the user, or when there is no saved note data in the product research database associated with the user.

In an embodiment, the comparison of the text string(s) to the saved note data to determine if there is a saved note with a subject that matches the text string(s) is performed using text analytics such as those described previously.

In an embodiment, the comparison of the text string(s) to the saved note data to determine if there is a match is performed in the background without user interaction as described previously.

Also at block 108, content is added to the created note. Content includes data in any type of format such as, but not limited to, one or more of image data, text data (entered by the user and/or copied from a web page), and audio data. In an embodiment, the content is created by the user specifying content (e.g., text, images, etc.) to save from a web page currently being viewed, and/or by the user typing in text. The content may be saved in the product research database associated with the user and/or a URL to the content may be saved to the product research database. Thus, in the embodiment shown in FIG. 1, at block 108 data related to activity performed by the consumer at an electronic commerce website is collected, and stored as product research data (e.g., in a product research database) associated with the consumer.

At block 110, the product research tool displays a saved note(s) about the product currently being viewed by the user. The content and/or heading data about the product note may be displayed in response to a request by a user of the product research tool to view the note. In addition, content of the product note (all or a subset) and/or heading data (all or a subset) about the product note may be displayed on a display screen based on the product research tool detecting that the user is viewing a web page describing an attribute that is similar to the attribute described by the saved note being displayed. Notes related to one or more other products within a product category may be displayed in this manner. In an embodiment, the detecting is performed in the background without user interaction as described previously. Thus, in the embodiment shown in FIG. 1, the product research tool detects that the consumer is accessing an electronic commerce website that includes information about a product, searches the product research data for data related to the product, and when data related to the product is found presents the consumer (e.g., by sending commands to a display device) with related data.

One or more products may be created within each of the one of more product categories. An embodiment of the product research tool identifies that the user is browsing a previously saved product on a different electronic commerce website. The product research tool opens the matching product entry that is saved in the product research database, and then associates and merges user notes (from multiple websites) related to the product.

The product research tool allows users to create one or more product notes (e.g., "superb colors", "46 inches") for each product entry. The user may select any arbitrary text in the product page (including forum and expert review pages) as content, add it as a note, and associate it with the right product in the product research tool. In an embodiment, the product research tool records (e.g., in the product research database the location (e.g., a URL) of the selected text/note and displays the selected text/note on subsequent visits to the web page. In an embodiment, the association of the content with the product and product attribute is automated.

In an embodiment, the product research tool detects text (or other sources of text strings as described previously) on a product page related to a product attribute(s) and suggests it as a possible selection for the user to add as a note. The product research tool may identify a product attribute (e.g., weight, picture quality, durability, battery) for each user note (e.g., the note subject). The product research tool may then organize the notes by the identified attributes (e.g., 4.5 pound relates to a note subject of "weight", 46" to "dimension", and superb colors to "picture quality"). In an embodiment, quantitative (e.g. 46") and qualitative values ("superb") are extracted from notes and associated with product attributes by performing text extraction and feature detection techniques. For example, the product research tool can examine the structure of the text (e.g. 46") and determine that the pattern <NUMBER><SYMBOL "> is associated with the size of the display. Likewise, for a qualitative attribute the product research tool can examine the context in which the text is used (e.g., " . . . colors are superb . . . ") and using a dictionary and basic pattern matching can map attribute "superb" with feature "display quality" if "color" is in a dictionary associated with "display quality."

An embodiment of the product research tool merges and sorts notes about the same attribute across different products within the product category.

An embodiment of the product research tool identifies attributes of interest to the user, for example, based on notes in other product entries in the same product category (e.g., by detecting that the user has created several notes about the weight of the camera). In response to identifying an attribute of interest to the user, the product research tool detects text related to the attribute of interest and automatically creates notes for this attribute in the other product entries within the product category.

The product research tool may also allow a user to share product notes, entries and categories with others in their social network (e.g., Facebook). In an embodiment, comments made via a social network are automatically associated back to the entries in the product research database. This is performed, for example, based on knowing the source of the question (user/product/feature) and using a pointer back to the entry that is encoded in the question so that replies go back to the right question. This allows the user and (allowed) people in the user's social network to comment on any note, product, or product category associated with the user. In addition, other products may be suggested to the user by people in their social network. The user may determine the weight to apply to these suggestions based on factors such as, their own product research history, the perceived expertise of the person making a suggestion, and the user trust in their social network. An embodiment of the product research tool allows a user to select which other users that they would like to see product notes and highlights from. Data from a current user may be distinguishable (e.g., by tag, display attribute such as color, etc.) from data retrieved from other users.

FIG. 2 depicts contents of a product research database (or other location of product research data) in accordance with an embodiment. The product research database may be stored in any storage format that supports the types of updates and accesses described herein (e.g., a relational database format, and a file system format). The example product research database shown in FIG. 2 relates to a microwave oven and includes product category data 202 which includes product category notes 204, and product data 206 210 214 which includes product notes 208 212. As shown in FIG. 2, the subjects of the product category notes 204 include: user notes that include text input by the user; buying guide notes that include an image(s), text (user input and/or copied from a webpage or document), and a URL of the location of a buying guide; expert suggestions that includes image(s) and URL; and a consumer guide that includes a URL. Each subject may include more than one entry, for example, the buying guide subject may include two or more buying guides.

The product research database shown in FIG. 2 includes product data 206 for "PRODUCT A—BRAND Y MODEL K", product data 210 for "PRODUCT B—BRAND Y MODEL W", and product data 214 for "PRODUCT X." As shown in FIG. 2, the product notes 208 for product data 206 and the product notes 212 for product data 210 have some subjects in common (e.g., "CAPACITY" and "COOKING POWER") and other subjects that are not in common (e.g., "PICTURE" and "COLOR"). Additionally, though, both have a note with the subject "CAPACITY", the content of the note is different for product data 206 (image and URL) than it is for product data 210 (text and URL). In an embodiment, all notes across a product category have the same subjects. For example, once a subject is created for a note in one group of product data, a note is created with the same subject and associated with the other products within the product category. In an embodiment, the content of the created notes generated based on user input and/or in the background as the user accesses different web pages. In an embodiment, the product research database also stores which, if any, of the product(s) were actually purchased by the user.

Figure 3:
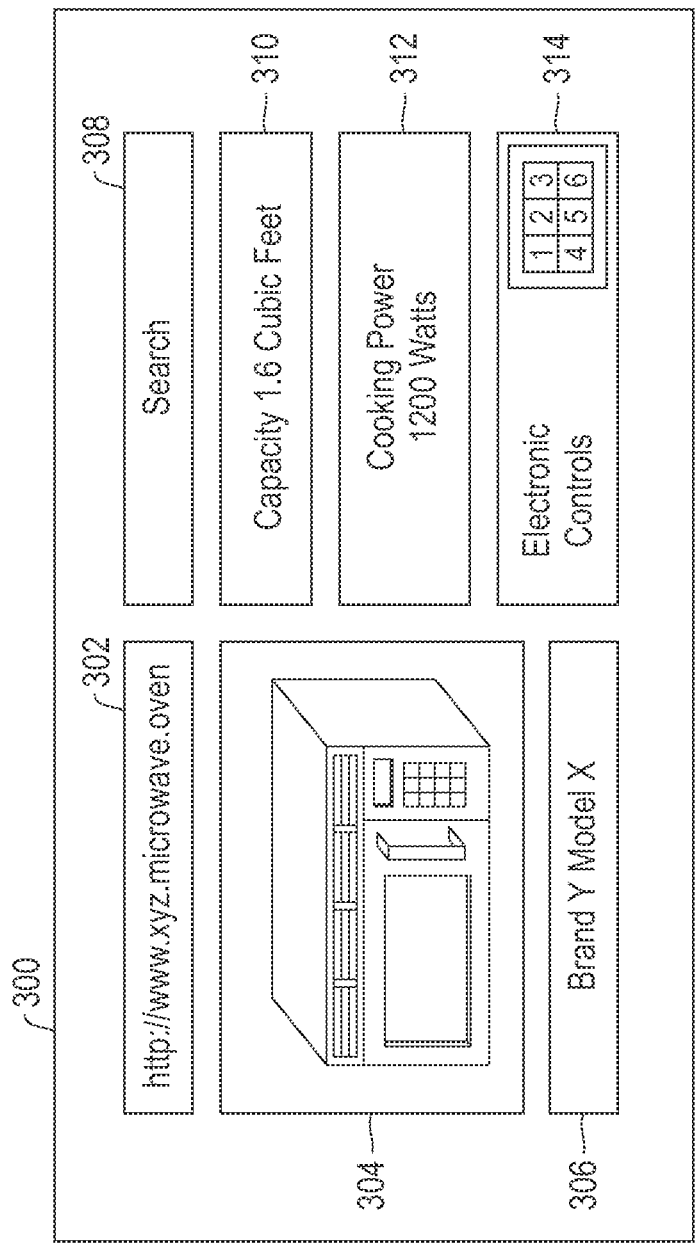
FIG. 3 depicts a user interface of a web browser for providing online product research in accordance with an embodiment.

FIG. 3 depicts a user interface 300 of a web browser of the product research tool for providing online product research in accordance with an embodiment. FIG. 3 includes a URL 302 of the current web page being displayed, and a search term input box 308 for the user to enter any search terms. In the example shown in FIG. 3, the category of the products currently being researched by the consumer is microwave ovens. The user interface 300 of FIG. 3 shows an image of a microwave oven 304, and an identifier of the product 306, labeled as "BRAND Y MODEL X." Also shown in FIG. 3, are the capacity attribute 310, cooking power attribute 312, and controls attribute 314 of product 306. In an embodiment, each of these attributes is the subject of a note associated with the product 306. For example, contents of a note having a subject of capacity is the text "1.6 cubic feet", contents of a note having a subject of cooking power is the text "1200 watts", and contents of a note having a subject of controls is the text "electronic controls" and an image showing the controls for the product 306. The notes and note contents may be created and saved in any manner described herein.

Figure 4:
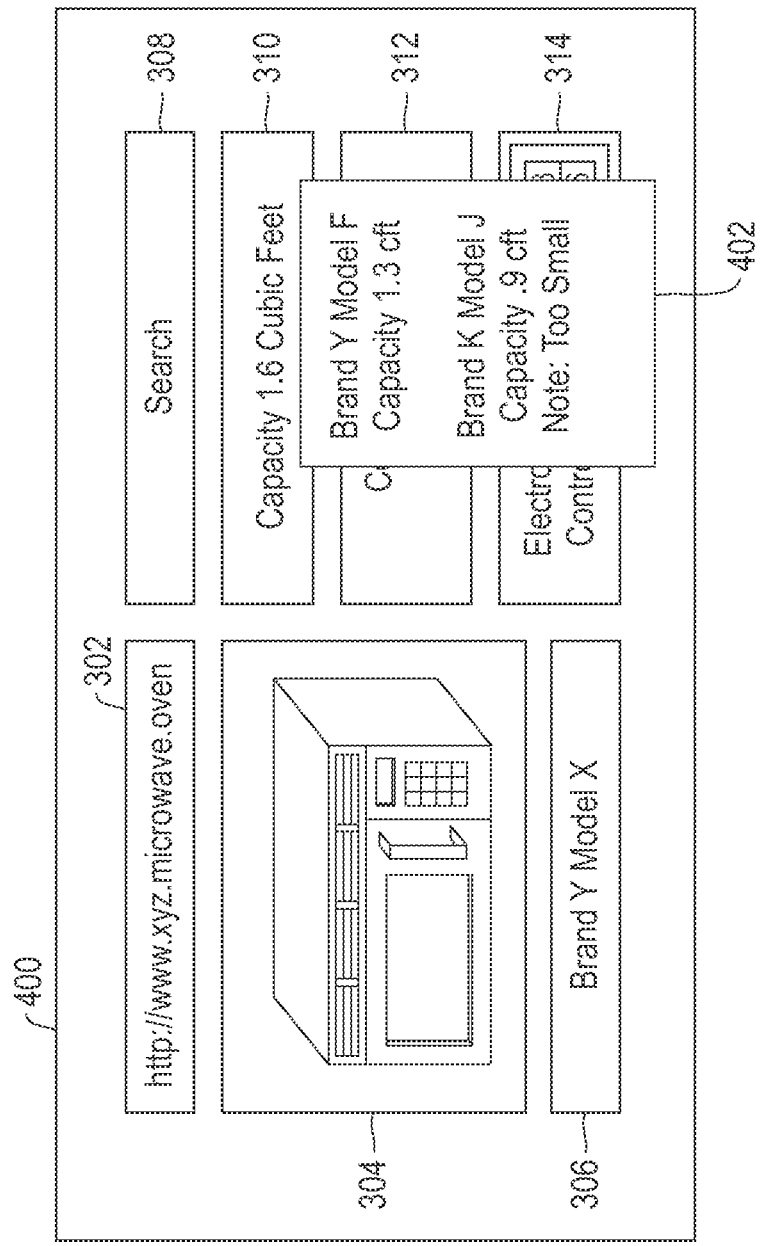
FIG. 4 depicts a user interface of a web browser for comparing a product attribute of multiple products in accordance with an embodiment.

FIG. 4 depicts a user interface 400 of a web browser of the product research tool for comparing a product attribute of multiple products in accordance with an embodiment. As shown in FIG. 4, the user is currently pointing to a location on the user interface 400 corresponding to the capacity attribute 310 (as determined, e.g., based on a cursor location or pointer location). In accordance with an embodiment, the product research tool presents a corresponding attributes user interface 402, in this example corresponding capacity attributes, from other products so that they can be compared to the capacity attribute 310 of the product 306 currently being viewed. In an embodiment, contents of the corresponding attributes user interface 402 are sourced from notes located in the product research database that have been determined to have subjects that are related to or match (as determined, for example, using data analytics) the subject of a note associated with the capacity attribute 310 of the current product 306. The display of related notes occurs as the user moves around the screen and/or to different web pages. For example, if the user moves a pointer or cursor to a location that corresponds to the controls attribute 314, then contents of notes relating to the controls of other products will be presented to the consumer (e.g., displayed on the display device). In this manner, a user can compare data about the attributes of two or more products in a category based on notes associated with attributes of the product. This allows users to compare two products side by side based on a question regarding features of the product.

In an embodiment, the corresponding attributes user interface 402 is automatically presented to a user when it is detected that the user is browsing a product page, even when the product page is not being browsed via the product research tool. The product research tool may indicate visually a current product entry in the product research database that matches the product page currently being viewed by the user.

In addition, a user may rank the product research data for a product category based on notes associated with attributes of the products to filter products in a product category based on values associated with attributes of the product, to weigh the importance of a feature in a product category (e.g., user can sort based on aggregate values using weights), and to visualize products based on values associated with attributes of the products. In an embodiment, the ranking is performed by assigning a rating to the attributes.

In an embodiment, HTML product pages are generated from the highlights and notes for a given product and separate ones for a given category.

An embodiment includes a data mining system that harvests the information that is collected by the product research tool and stored in the product research database to create consumer profiles.

In an embodiment, the product research database for each consumer includes consumer profile information such as product categories of interest to the consumer, product entries for the product categories, product notes (e.g., that identify features and attributes of products a consumer is interested in/or concerned about, and that indicate the consumer's and other consumers sentiments about the products and product attributes), friends and colleagues that the consumer interacted with and notes that they exchanged, websites that the consumer visited, and interaction events with the product research tool (e.g., rating of product attributes, and sorting, filtering and/or comparing of products).

In an embodiment, the consumer profiles are dynamically updated upon each user interaction and are compared to profiles of other consumers. These consumer profiles are used collectively to generate a decision tree specific to a current consumer that has product attributes as the decision nodes, has specific products has the leaf nodes, and the probabilities of specific product purchases (based on similar profiles) as the edges.

Retailers can use the decision trees and/or consumer profiles to predefine trigger points at which time to send coupons (or other purchasing incentives) to potential consumers if they purchase immediately. This ability is similar to having an individual seasoned sales person with the authority to give discounts when consumers are ready to buy, which allows for the use of triggers in decision making. Thus, embodiments provide a real-time incentive system that matches bidders (e.g., product manufacturers, retailers, etc.) with specific sequences of branches of the decision tree of a specific potential customer. The bidders may then offer the potential customer incentives, such as, but not limited to coupons for specific products, brands and/or electronic commerce sites before the potential customer's product research is completed. Embodiments also provide a real-time advertisement system that matches bidders with specific sequences of branches in the decision tree of a specific potential customer to sell them advertisements for specific products, brands and/or electronic commerce sites before the potential customer's product research is completed.

Figure 5:
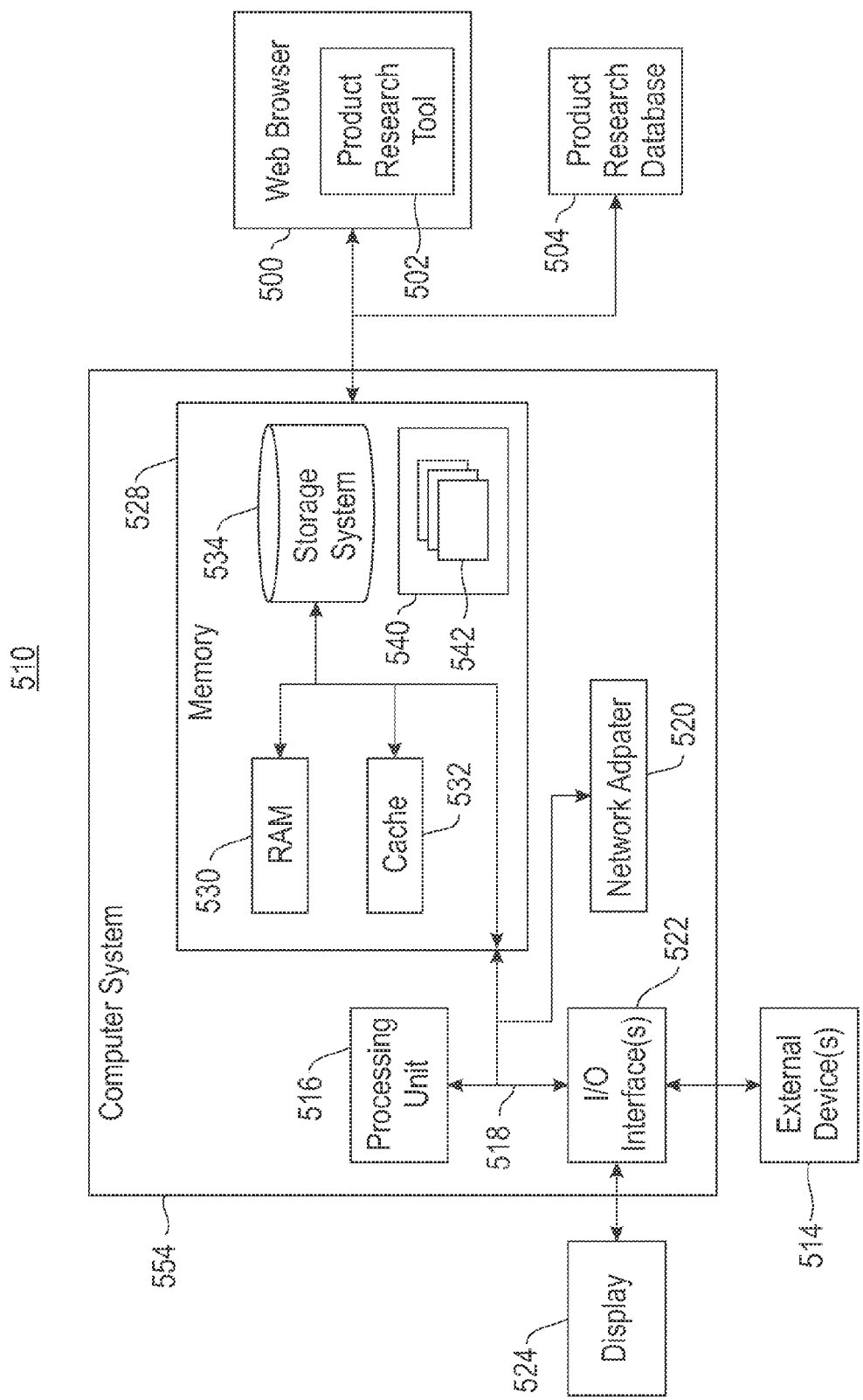
FIG. 5 depicts a computer system for providing online product research in accordance with an embodiment.

Referring now to FIG. 5, a schematic of an example of a computer system 554 in a network environment 510 is shown. The computer system 554 is only one example of a suitable computer system and is not intended to suggest any limitation as to the scope of use or functionality of embodiments of the invention described herein. Regardless, computer system 554 is capable of being implemented and/or performing any of the functionality set forth hereinabove.

In network environment 510, the computer system 554 is operational with numerous other general purpose or special purpose computing systems or configurations. Examples of well-known computing systems, environments, and/or configurations that may be suitable as embodiments of the computer system 554 include, but are not limited to, personal computer systems, server computer systems, cellular telephones, thin clients, thick clients, hand-held or laptop devices, multiprocessor systems, microprocessor-based systems, set top boxes, programmable consumer electronics, network personal computer (PCs), minicomputer systems, mainframe computer systems, and distributed cloud computing environments that include any of the above systems or devices, and the like.

Computer system 554 may be described in the general context of computer system-executable instructions, such as program modules, being executed by one or more processors of the computer system 554. Generally, program modules may include routines, programs, objects, components, logic, data structures, and so on that perform particular tasks or implement particular abstract data types. Computer system 554 may be practiced in distributed computing environments, such as cloud computing environments, where tasks are performed by remote processing devices that are linked through a communications network. In a distributed computing environment, program modules may be located in both local and remote computer system storage media including memory storage devices.

As shown in FIG. 5, computer system 554 in network environment 510 is shown in the form of a general-purpose computing device. The components of computer system 554 may include, but are not limited to, one or more computer processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 554 typically includes a variety of computer system readable media. Such media may be any available media that is accessible by computer system 554, and it includes both volatile and non-volatile media, removable and non-removable media.

System memory 528 can include computer system readable media in the form of volatile memory, such as random access memory (RAM) 530 and/or cache memory 532. Computer system 554 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. An example application program or module is depicted in FIG. 5 as web browser 500, including product research tool 502 which includes logic that is configured to generate, access, and update a product research database 504 for an associated user. Although the product research tool 502 is depicted within web browser 500, all or portions of the product research tool 502 can be incorporated in any application or module, such as a file navigation tool. The product research database 504 can be stored in storage system 534 or in other portions of system memory 528. Alternatively, the product research database 504 may be stored elsewhere in the network environment 510. The product research database 504 is used herein as one example of a location where the product research data may be stored, it is not intended to imply that a database system is required as the product research data may be stored in any manner that allows types of accesses described herein.

Computer system 554 may also communicate with one or more external devices 514 such as a keyboard, a pointing device, a display device 524, etc.; one or more devices that enable a user to interact with computer system 554; and/or any devices (e.g., network card, modem, etc.) that enable computer system 554 to communicate with one or more other computing devices. Such communication can occur via input/output (I/O) interfaces 522. Still yet, computer system 554 can communicate with one or more networks such as a local area network (LAN), a general wide area network (WAN), and/or a public network (e.g., the Internet) via network adapter 520. As depicted, network adapter 520 communicates with the other components of computer system 554 via bus 518. It should be understood that although not shown, other hardware and/or software components could be used in conjunction with computer system 554. Examples, include, but are not limited to: microcode, device drivers, redundant processing units, external disk drive arrays, redundant array of independent disk (RAID) systems, tape drives, and data archival storage systems, etc.

It is understood in advance that although this disclosure includes a detailed description on a particular computing environment, implementation of the teachings recited herein are not limited to the depicted computing environment. Rather, embodiments are capable of being implemented in conjunction with any other type of computing environment now known or later developed (e.g., any client-server model, cloud-computing model, etc.).

Technical effects and benefits include providing a customer centric approach that allows an end user to have a cross provider, cross source view to content of interest when performing online product research. Embodiments provide a tool for consumers to collect and organized product information from websites and social networks based on their needs and priorities to directly support purchasing decision makings. Technical effects and benefits also include providing consumer data to retailers for segmenting potential purchasers. Embodiments provide a tool for retailers to collect customer information in order, for example, to correctly target consumers with incentives and to reach potential consumers before they make purchasing decisions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of presenting online product research data within a web browser, the method comprising:
   collecting, by one or more processors, data related to activity performed by a consumer at a first electronic commerce website, the data including information about a first product, the collecting data including determining a product category of the first product and presenting the product category of the first product to the consumer for verification;
   storing, by the one or more processors, as product research data, the information about the first product, the information about the first product including the product category of the first product;
   associating, by the one or more processors, the product research data with the consumer;
   detecting, by the one or more processors, that the consumer is accessing a location in a second electronic commerce website that includes information about a second product, the detecting including locating, by the one or more processors, a cursor in the second electronic website;
   responsive to the detection of the accessed location:
      deriving, by the one or more processors, one or more text strings based on HTML tags of the second electronic commerce website;
      comparing, by the one or more processors, the derived text string to the stored product research data;

retrieving, by the one or more processors, the information about the first product in response to the comparison of the product research data to the derived text string; and presenting, by the one or more processors, within a web browser, a user interface element incorporating the information about the first product, the user interface element presented simultaneously with the second electronic commerce website that includes information about the second product.

2. The method of claim 1, further comprising storing at least one of a subset of the information about the second product and text input by the consumer as additional product research data associated with the consumer.

3. The method of claim 1, wherein the second product is associated with the product category.

4. The method of claim 1, wherein the information about the first product is associated with an attribute of the first product, the information about the second product is associated with an attribute of the second product, and the attribute of the first product is related to the attribute of the second product.

5. The method of claim 1, wherein the information about the first product includes notes associated with a plurality of attributes of the first product.

6. The method of claim 5, further comprising:
receiving instructions from the consumer to assign a rating to the plurality of attributes of the first product; and
assigning the rating to the plurality of attributes of the first product.

7. The method of claim 1, wherein the first product and the second product are the same product.

8. The method of claim 1, further comprising:
comparing content of the product research data associated with the consumer with content of product research data associated with at least one other consumer; and
determining a probability that the consumer will purchase the first product based on the comparing.

9. The method of claim 8, further comprising providing a purchasing incentive to the consumer based on the probability.

10. A computer program product for presenting providing online product research data within a web browser, the computer program product comprising:
a non-transitory computer readable storage medium having computer readable program code embodied therewith, said program code being executable by a processor to:
collect, by one or more processors, data related to activity performed by a consumer at a first electronic commerce website, the data including information about a first product, the collecting data including determining a product category of the first product and presenting the product category of the first product to the consumer for verification;
store, by the one or more processors, as product research data, the information about the first product, the information about the first product including the product category of the first product;
associate, by the one or more processors, the product research data with the consumer;
detect, by the one or more processors, that the consumer is accessing a location in a second electronic commerce website that includes information about a second product, the detecting including locating, by the one or more processors, a cursor location in the second electronic website;
responsive to the detection of the accessed location:
derive, by the one or more processors, one or more text strings based on HTML tags of the second electronic commerce website;
compare, by the one or more processors, the derived text string to the stored product research data;
retrieve, by the one or more processors, the information about the first product in response to the comparison of the product research data to the derived text string; and
present, by the one or more processors, within a web browser, a user interface element incorporating the information about the first product, the user interface element presented simultaneously with the second electronic commerce website that includes information about the second product.

11. The computer program product of claim 10, wherein the program code is further executable by the processor to store at least one of a subset of the information about the second product and text input by the consumer as additional product research data associated with the consumer.

12. The computer program product of claim 10, wherein the second product is associated with the product category.

13. The computer program product of claim 10, wherein the information about the first product is associated with an attribute of the first product, the information about the second product is associated with an attribute of the second product, and the attribute of the first product is related to the attribute of the second product.

14. The computer program product of claim 10, wherein the information about the first product includes notes associated with a plurality of attributes of the first product.

15. The computer program product of claim 14, wherein the program code is further executable by the processor to:
receive instructions from the consumer to assign a rating to the plurality of attributes of the first product; and
assign the rating to the plurality of attributes of the first product.

16. The computer program product of claim 10, wherein the first product and the second product are the same product.

17. The computer program product of claim 10, wherein the program code is further executable by the processor to:
compare content of the product research data associated with the consumer with content of product research data associated with at least one other consumer; and
determine a probability that the consumer will purchase the first product based on the comparing.

18. The computer program product of claim 17, wherein the program code is further executable by the processor to provide a purchasing incentive to the consumer based on the probability.

* * * * *